(12) United States Patent
Van Der Zee

(10) Patent No.: US 10,589,941 B2
(45) Date of Patent: *Mar. 17, 2020

(54) METHOD AND SYSTEM FOR TRANSPORTING AND STORING AT LEAST TWO WIND TURBINE BLADES

(71) Applicant: LM WP PATENT HOLDING A/S, Kolding (DK)

(72) Inventor: Jacobus Van Der Zee, Kolding (DK)

(73) Assignee: LM WP PATENT HOLDINGS A/S, Kolding (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,319

(22) Filed: Jun. 16, 2017

(65) Prior Publication Data

US 2017/0284374 A1 Oct. 5, 2017

Related U.S. Application Data

(63) Continuation of application No. 14/437,714, filed as application No. PCT/EP2013/072385 on Oct. 25, 2013, now Pat. No. 9,709,025.

(30) Foreign Application Priority Data

Oct. 26, 2012 (GB) .................................. 1219279.5

(51) Int. Cl.
*B65G 57/00* (2006.01)
*A47B 81/00* (2006.01)
(Continued)

(52) U.S. Cl.
CPC .............. *B65G 57/00* (2013.01); *A47B 81/00* (2013.01); *A47B 81/005* (2013.01); *B65G 57/18* (2013.01);
(Continued)

(58) Field of Classification Search
CPC ............ B60P 3/40; F03D 1/005; F03D 13/40
(Continued)

(56) References Cited

U.S. PATENT DOCUMENTS 7,690,875 B2   4/2010   Grabau
7,704,024 B2   4/2010   Kootstra et al.
(Continued)

FOREIGN PATENT DOCUMENTS

CN   101259897 A   9/2008
EP     1387802 A1   2/2004
(Continued)

*Primary Examiner* — Hilary L Gutman
(74) *Attorney, Agent, or Firm* — Nath, Goldberg & Meyer; Jerald L. Meyer; Tanya E. Harkins

(57) ABSTRACT

A transportation and storage system for at least two wind turbine blades and comprising a first wind turbine blade and a second wind turbine blade is described. The wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction. The tip end of the second wind turbine blade extends beyond the root end of the first wind turbine blade, and the tip end of the first wind turbine blade extends beyond the root end of the second wind turbine blade, when the first and the second wind turbine blades are arranged in the packaging system.

10 Claims, 6 Drawing Sheets

Figure 1:
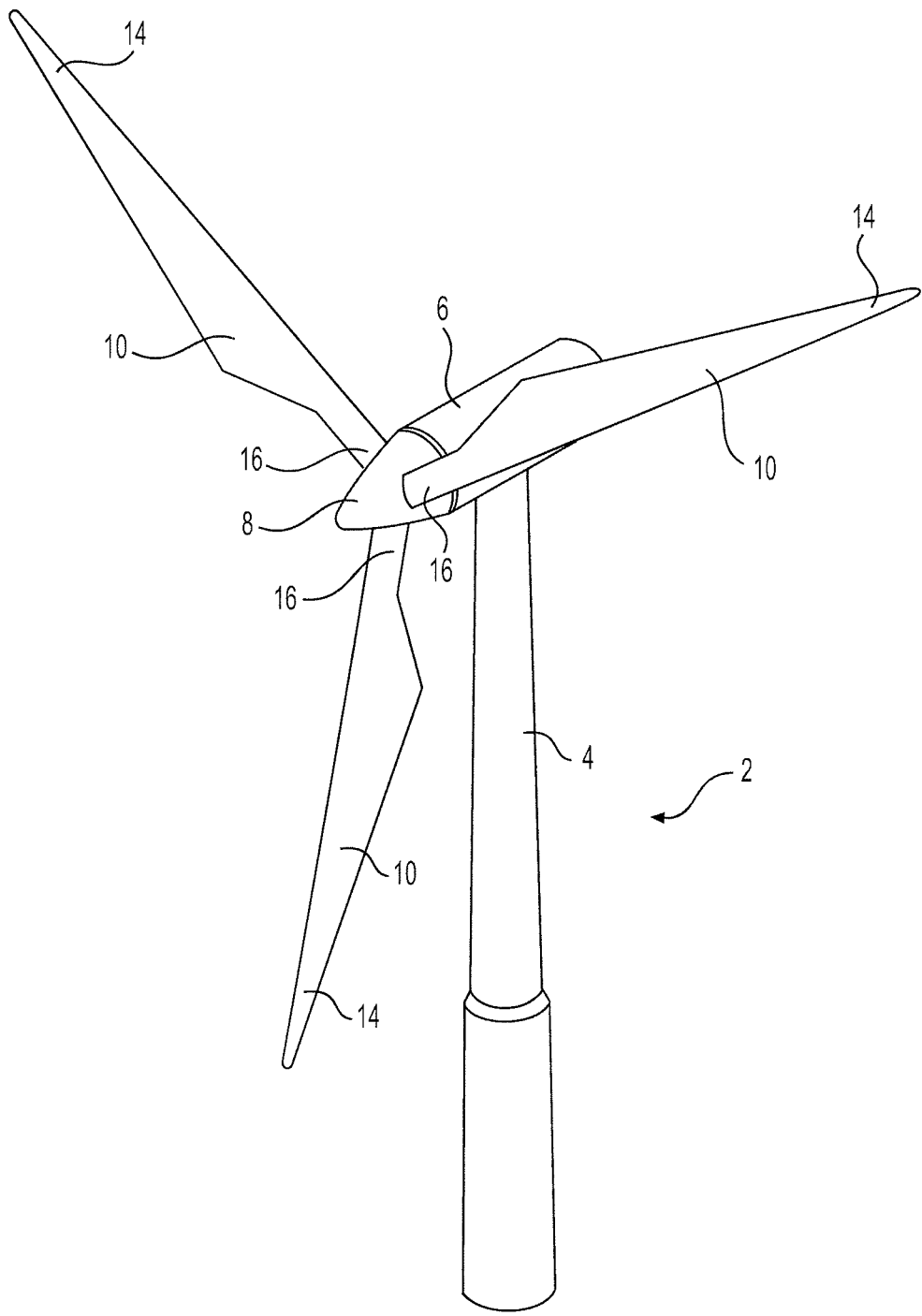

(51) Int. Cl.
  *F03D 13/40* (2016.01)
  *B65G 57/18* (2006.01)
  *F03D 1/06* (2006.01)
(52) U.S. Cl.
  CPC ........... *F03D 1/0675* (2013.01); *F03D 13/40* (2016.05); *F05B 2240/221* (2013.01); *Y02E 10/72* (2013.01); *Y02E 10/721* (2013.01); *Y02E 10/726* (2013.01)
(58) Field of Classification Search
  USPC .......................................................... 410/44
  See application file for complete search history.

(56) References Cited

U.S. PATENT DOCUMENTS

| | | | |
|---|---|---|---|
| 8,342,491 B2 | 1/2013 | Jorgensen et al. | |
| 8,511,921 B2 | 8/2013 | Riddell et al. | |
| 8,602,700 B2 | 12/2013 | Johnson | |
| 8,967,929 B2 | 3/2015 | Frederiksen | |
| 2007/0177954 A1 | 8/2007 | Kootstra et al. | |
| 2007/0189895 A1 | 8/2007 | Kootstra et al. | |
| 2010/0143062 A1 | 6/2010 | Tobergte | |
| 2011/0142660 A1 | 6/2011 | Bakhuis et al. | |
| 2013/0216325 A1 | 8/2013 | Johnson | |
| 2016/0053740 A1 | 2/2016 | Landrum | |

FOREIGN PATENT DOCUMENTS

| | | | | |
|---|---|---|---|---|
| EP | 2239459 A2 | 10/2010 | | |
| EP | 2333315 A2 | 6/2011 | | |
| EP | 2669506 A1 * | 12/2013 | ............ | F03D 13/40 |
| EP | 2669506 A1 | 12/2013 | | |
| EP | 2669507 A1 * | 12/2013 | ............ | B65D 85/68 |
| EP | 2669507 A1 | 12/2013 | | |
| WO | 2010070388 A1 | 6/2010 | | |
| WO | WO-2010105626 A2 * | 9/2010 | ............ | B65D 61/00 |
| WO | 2011098086 A1 | 8/2011 | | |
| WO | WO-2012019895 A1 * | 2/2012 | ............... | B60P 3/40 |

* cited by examiner

METHOD AND SYSTEM FOR TRANSPORTING AND STORING AT LEAST TWO WIND TURBINE BLADES

This is a Continuation Application of U.S. patent application Ser. No. 14/437,714, filed Apr. 22, 2015, an application claiming the benefit from Great Britain Application No. 1219279.5, filed Oct. 26, 2012, the contents of each of which are hereby incorporated by reference in their entirety.

FIELD OF THE INVENTION

The present invention relates to a method of transporting or storing of wind turbine blades as well as a transportation and storing system for transporting at least two wind turbine blades including a first wind turbine blade and a second wind turbine blade.

BACKGROUND OF THE INVENTION

Wind turbine blades used for horizontal axis wind turbines for generating electrical power from the wind can be rather large and may today exceed 70 metres in length and 4 metres in width. The blades are typically made from a fibre-reinforced polymer material and comprising an upwind shell part and a downwind shell part. Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the blades. It is not uncommon that the transportation costs amount to 20 percent of the total costs for manufacturing, transporting and mounting the wind turbine blade on the rotor of a wind turbine blade. Also, some blades are transported to the erection site through different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. The prior art shows various solutions for transporting more than one rotor blade using a single container or other packaging system, which is an obvious way to reduce the transport costs. However, the afore-mentioned restrictions and limits may increase the difficulty of transporting a plurality of blades using the same packaging system. EP1387802 discloses a method and system for transporting two straight wind turbine blades, where the root end of a first blade is arranged in a first package frame, and the tip end of a second, neighbouring blade is arranged in a second package frame that is arranged next to and connected to the first package frame with the effect that the blades are stored compactly alongside each other in a "tip-to-root" arrangement. However, in this transport system the tip end frames support the blades at the very tip of the blades, where they are mechanically most fragile. Further, the package frames are arranged at the root end face and the blade tip. Therefore, the distance between the package frames are approximately equal to the length of the blades. For very long blades of 45 metres or longer, this might not be possible due to local regulations and restrictions on transport.

US 2011/0142660 discloses a wind turbine blade, which is provided with an integrated attachment bore through the spar caps of the blades. The attachment bores are structurally configured for receipt of a handling mechanism for supporting the blade during transport. Two blades may be arranged in a tip-to-root configuration, where the tip end of one blade is arranged nearly adjacent the root end of a second blade.

WO 2011/098086 discloses a system for transporting a wind turbine component via a first railcar and a second railcar. One embodiment shows the transport of two blades in a tip-to-root configuration, where a first frame is mounted on a first support member slidingly and rotatingly coupled to the first railcar, and a second frame is mounted on a second support member rotatingly coupled to a second rail car. The tip end of one blade is arranged nearly adjacent the root end of a second blade.

It is therefore an object of the invention to obtain a new method and system for storing and transporting a plurality of wind turbine blades, which overcome or ameliorate at least one of the disadvantages of the prior art or which provide a useful alternative.

SUMMARY OF THE INVENTION

According to a first aspect, this is obtained by a method for transporting or storing at least two wind turbine blades and comprising a first wind turbine blade and a second wind turbine blade, the wind turbine blades each having a root end and a tip end, wherein the method comprises the steps of: a) attaching a first root end frame in form of a first root end bracket to a root end face of the first wind turbine blade, b) arranging the tip end of the first wind turbine in a first tip end frame, c) attaching a second root end frame in form of a second root end bracket to a root end face of the second wind turbine blade, d) arranging the tip end of the second wind turbine in a second tip end frame, e) placing the first wind turbine blade so that the tip end of the first wind turbine blade points in a first direction, f) placing the second wind turbine blade adjacent and in immediate vicinity to the first wind turbine blade so that the tip end of the second wind turbine blade points in a second direction, which is substantially opposite to the first direction, and, if not already connected, g) connecting the second tip end frame to the first root end frame, and connecting the first tip end frame to the second root end frame so that the tip end of the second wind turbine blade extends beyond the root end of the first wind turbine blade. The tip end of the first wind turbine blade may also extend beyond the root end of the second wind turbine blade. This will inevitably be the case, if the first wind turbine blade and the second wind turbine blade are of the same length. It is also clear that the tip end of the first wind turbine blade extends beyond the second root frame, and that the tip end of the second wind turbine blade extends beyond the first root frame.

Thus, it is clear that the two wind turbine blades are arranged substantially parallel to each other and oriented in opposite directions. Since the thickness of the blades is typically decreasing from the root end towards the tip end, the blades can with the new "tip-to-root" layout be arranged on top of each other via frames having a relatively small combined cross-section. Further, the new setup ensures that a tip end section of the second wind turbine blade may be supported farther from the tip end than with a common frame assembly for supporting the root of the first wind turbine blade and a tip section of the second blade. Thereby, the tip end section may be supported at a position where the blade is mechanically stronger than right at the tip end. The first root end bracket and the second root end bracket provide a particularly simple solution, where the frame or bracket may be attached to for instance a root end plate of the blade and without having to support the exterior of the blade. Thus, external damages to the outer surface of the blades may more easily be avoided. The tip end frames (e.g. with receptacles) may be attached to the brackets, so that the tip end extends beyond the bracket, when the blade is inserted into the tip end frame (and receptacle).

Additionally, the new transport layout ensures that the frame assemblies may be arranged longitudinally closer to each other, thereby being able to abide to local regulations that may put restrictions on the maximum distance between support frames for transport.

According to an advantageous embodiment, the first wind turbine blade and the second wind turbine blade in steps e) and f) are stacked on top of each other, i.e. so that the second wind turbine blade is arranged above the first wind turbine blade. Advantageously, the first wind turbine blade and the second wind turbine blade are arranged so that chordal planes of their respective tip ends are arranged substantially horizontally. By "substantially horizontally" is meant that the chordal plane may vary up to +/−25 degrees to horizontal, in particular since the chordal plane may be twisted along the span of the wind turbine blade.

In a preferred embodiment, the blades are arranged so that an upwind side (or pressure side) of the blade is facing substantially downwards.

According to an alternative embodiment, the first wind turbine blade and the second wind turbine blade in steps e) and f) are stacked side-by-side. In such an embodiment, the first wind turbine blade and the second wind turbine blade may advantageously be arranged so that chordal planes of their respective tip ends are arranged substantially vertically. Thus, the blades may for instance be arranged so that they are supported at their leading edges (which are mechanically stronger than the trailing edges) via an upwardly facing receptacle.

In a stacking system for storing more than two blades, it is also possible to stack the blades both horizontally and vertically, i.e. in a stacked array.

The method advantageously relates to transport and storage of blades having a blade length of at least 40 metres, or at least 45 metres, or even at least 50 metres. The blades may be prebent so that, when mounted on an upwind configured horizontal wind turbine in a non-loaded state, they will curve forward out of the rotor plane so that the tip to tower clearance is increased.

The first and the second wind turbine blades may be prebent. Such prebent blades may be arranged in the tip end frames and root end frames so that they are straightened slightly or fully during transport, e.g. as shown in WO05005286 by the present applicant. However, the blades need not forcedly be straightened. Since the blades are supported near the ends and the blades are arranged with the upwind side facing downwards, the own weight of the blade may straighten the blades due to the gravitational forces acting on the middle part of the blade.

The tip end frames preferably comprise a receptacle for supporting a tip end section. Thus, the first tip end frame comprises a first tip end receptacle, and the second tip end frame comprises a second tip end receptacle. Depending on the particular solution, the receptacle may for instance either support the pressure side of the blade or alternatively the leading edge of the blade. However, in principle the receptacle may also support the suction side of the blade or even the trailing edge of the blade. The frames themselves may be used as lifting tools so that two or more blades may be lifted in one go and without imposing stress to the blades.

In a particularly advantageous embodiment, the second tip end frame is detachably connected to the first root end frame, and the first tip end frame is detachably connected to the second root end frame. Thus, it is clear that the frames may be constructed as an integral solution comprising both a root end frame and a tip end frame (or receptacle), or as separate frames for the root and the tip. The latter solution has the advantage, that the second blade may more easily be disengaged from the first blade, simply by detaching the tip end frames from the root end frames.

In another embodiment, the connection parts of the root end frames and the tip end frames that connect to or fix the blade in the frame may be hinged to the frame itself. This can for instance for the root be achieved by connecting a plate to the root of the blade that is hingedly connected to the frame. Similarly, this can be achieved by letting a tip end receptacle be hingedly connected to the tip end frame. Such embodiments have the advantage of alleviating loads that would otherwise be introduced to either the frames or blades due to blade deflections or the like during transport.

In yet another advantageous embodiment, the first root end frame and the second tip end frame are connected in a L-shaped or T-shaped configuration so that a base of the L- or T-shaped configuration is attached to the root end of the first wind turbine blade, and a transversely extending frame part (or extremity) of the L- or T-shaped configuration supports a longitudinal section of the tip end of the second wind turbine blade. The same of course also applies to the second root end frame and the first tip end frame. Advantageously, the L- or T-shaped configuration is formed so that the base is a root end face bracket attached to the root end face of the first blade, and the transversely extending frame part supports a tip end section of the second blade.

The frame connection is arranged so that the base of the L- or T-configuration is arranged vertically. The transversely extending frame part may be arranged to that it extends from the top or the bottom of the base. In this configuration the second wind turbine blade is arranged on top of the first wind turbine blade. The extremity or transversely extending frame part may thus support either a part of the suction side or the pressure side of the blade in an upwardly facing receptacle. Alternatively, the extremity may extend from the side of the base. In such a configuration, the blades are arranged side-by-side, and the extremity or transversely extending frame part may support either a part of the leading edge or the trailing edge of the blade in an upwardly facing receptacle.

If the blades are arranged so that both blades are facing with the leading edge downwards (in the side-by-side arrangement) or with the upwind shell parts facing downwards (in the vertically stacked arrangement), it is clear that the transversely extending frame parts of the two frame assemblies must be arranged inversely compared to the base frame. Thus, the two frame assemblies have slightly different configurations.

The L- or T-shaped frame assembly has the advantage that the transversely extending frame supports a larger part of the tip sections, thus better alleviating loads and possibly also minimising the necessary overhang of the tip part that extends beyond the root end frame.

In one embodiment, the longitudinal extent of the transversely extending frame part is at least 1 meter, advantageously at least 1.5 metres, more advantageously at least 2 metres. The longitudinal section of the tip end of the blade may be supported along the entire section, or it may be supported in a plurality of discrete sections within the extremity of the L- or T-shaped frame assembly.

As an alternative to the L- or T-shaped frame assembly, the root end frame and the tip end frame may be arranged substantially in the same plane.

Advantageously, a plurality of first wind turbine blades and second wind turbine blades are placed in an array, and wherein the wind turbine blades each comprise a shoulder defining a maximum chord of the blade, and wherein the blades are arranged so that the maximum chord forms an angle of between 20 and 75 degrees to a horizontal plane, advantageously between 22 and 73 degrees. Even more advantageously, the maximum chord forms an angle of between 15 and 35 degrees to a horizontal plane, advantageously between 20 and 30 degrees. It is clear that this stacking method may be advantageous to any configuration of stacking blades side by side with the root end and tip end arranged in the same direction. In a preferred embodiment, it is the root end of the blade that is turned between 15 and 35 degrees to a horizontal plane, advantageously between 20 and 30 degrees. The angle may for instance be defined by bond lines between an upwind shell part and a downwind shell part at the root end of the blade. In this setup, the blades in a stacked array may be arranged so that they slightly overlap with the shoulder of one blade extending partly over an adjacent blade, so that the upwind side of one blade near the shoulder faces down towards the downwind side near the leading edge of an adjacent blade. Thereby, it is possible to stack the blades in frames having a width corresponding to the diameter of the root or only slightly larger, even though the chord length of the shoulder exceeds this diameter.

In another embodiment, intermediate protection members are arranged between the first wind turbine blade and the second wind turbine blade. The intermediate protection members are preferably arranged at a longitudinal position between the first root end frame and the second root end frame. Advantageously, the intermediate protection members are arranged near the tip end frames so as to provide additional support to a tip end section of the wind turbine blade. The protection means prevent the blades from being damaged due to bending or the blades impacting each other. The intermediate protection members are particularly advantageous, when the blades are stacked on top of each other. In such a setup, the intermediate protection members may be used as support for supporting an additional tip end section of one blade and may transfer loads from the tip end of the upper blade to the mechanically stronger root region of the lower blade. Additional protection members may be arranged below the lowermost blade in a stacked array and a support platform or the ground. The additional protection member is advantageously arranged to support an additional tip end section of the lowermost blade, e.g. near the tip end frame of the lowermost blade.

The intermediate protection members may be made of a foamed polymer.

In another embodiment, a root end face of the first wind turbine blade is arranged within 45 metres of a root end face of the second wind turbine blade, advantageously within 42 metres. Accordingly, root end brackets or frames should also be arranged at maximum 45 metres or 42 metres from each other.

According to the first aspect, the invention also provides a transportation and storage system for at least two wind turbine blades and comprising a first wind turbine blade and a second wind turbine blade. The wind turbine blades each have a root end and a tip end. The system comprises a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction. The packaging system comprises a first root end frame in form of a first root end bracket for attachment to a root end face of the first wind turbine blade, a first tip end frame for supporting a tip end portion of the first wind turbine blade, a second root end frame in form of a second root end bracket for attachment to a root end face of the second wind turbine blade, and a second tip end frame for supporting a tip end portion of the second wind turbine blade. The second tip end frame is connected to the first root end frame, and the first tip end frame is connected to the second root end frame so that the tip end of the second wind turbine blade extends beyond the root end of the first wind turbine blade, and the tip end of the first wind turbine blade extends beyond the root end of the second wind turbine blade, when the first and the second wind turbine blades are arranged in the packaging system. It is also clear that the tip end of the first wind turbine blade extends beyond the second root frame, and that the tip end of the second wind turbine blade extends beyond the first root frame. Thus, again it is clear that the system is adapted to arranging the first and the second wind turbine blades substantially parallel to each other and pointing tip to root but with an overhang. The first root end bracket and second root end bracket provide a particularly simple solution, where the frame or bracket may be attached to for instance a root end plate of the blade and without having to support the exterior of the blade. Thus, external damages to the outer surface may more easily be avoided. The tip end frames (with receptacles) may be attached to the brackets, so that the tip end extends beyond the bracket, when the blade is inserted into the tip end frame (and receptacle).

The second tip end frame may be detachably connected to the first root end frame, and the first tip end frame may be detachably connected to the second root end frame. Thus, it is clear that the frames may be constructed as an integral solution comprising both a root end frame and a tip end frame (or receptacle), or as separate frames for the root and the tip. The latter solution has the advantage, that the second blade may more easily be disengaged from the first blade, simply by detaching the tip end frames from the root end frames.

In the tip end of the first wind turbine blade, when arranged in the first tip end frame, extends a first longitudinal extent beyond the first tip end frame, and the tip end of the second wind turbine blade, when arranged in the second tip end frame, extends a second longitudinal extent beyond the first tip end frame. In other words, the first tip end frame is adapted to package the tip end of first wind blade at a first distance from the tip, and the second tip end frame is adapted to package the tip end of the tip end of the second wind turbine blade at a first distance from the tip. The first distance and the second distance will of course typically be approximately the same. The first longitudinal extent and the second longitudinal extent may be at least 2 metres, advantageously at least 3.5 metres, and more advantageously, at least 5 metres. The blade tip may even extend at least 6, 7, or 8 metres beyond the tip end frame (and accordingly also the root end frame). The first longitudinal extent and second longitudinal extent may be at least 2.5%, or at least 5%, or at least 7.5%, or at least 10% of the blade lengths of the first wind turbine blade and second wind turbine blade, respectively.

In a particular advantageous embodiment, the storage system is adapted to stack the first and the second wind turbine blade on top of each other. The second tip end frame may for instance be attached to a top of the first root end frame, and the first tip end frame is attached to a bottom of the second root end frame. In this setup the blades are arranged so that chord planes of the tip ends of the blades are arranged substantially horizontally. The setup may be adapted to arrange the blades with an upwind shell part substantially downwards.

In an alternative embodiment, the tip end frames are attached to sides of the root end frames. In such a setup the chord planes of tip end of the blades are arranged substantially vertically, advantageously with a leading edge facing downwards.

In another embodiment, at least a first intermediate protective member is arranged between the first wind turbine blade and the second wind turbine blade. The first intermediate protective member may advantageously be arranged near the tip end of an upper arranged blade of the first wind turbine blade and the second wind turbine blade. Additionally, a second protective member may be arranged below the lower of the two wind turbine blades. In a stacked array, this blade will then also be an intermediate protective member arranged between two blades. Further, a protective member may be arranged below the lowermost blade in the stacked array. The intermediate protective members may be made of a foamed polymer.

It is clear that some of the provided solution may also be used for other configurations of transporting and storing blades, e.g. without the tip overhang.

Thus, according to a second aspect, the invention provides a method for transporting or storing at least two wind turbine blades and comprising a first wind turbine blade and a second wind turbine blade, the wind turbine blades each having a root end and a tip end, wherein the method comprises the steps of:
a) placing the root end of the first wind turbine blade in a first root end frame,
b) placing a tip end section of the first wind turbine blade in a first tip end frame,
c) placing the root end of the second wind turbine blade in a second root end frame, so that the second root end frame is arranged near the first tip end frame with the first tip end frame substantially above the second root end frame,
d) placing a tip end section of the second wind turbine blade in a second tip end frame, so that the second tip end frame is arranged near the first root end frame with the second tip end frame substantially below the first root end frame, wherein the method comprises the additional step of arranging an intermediate protection means between the first wind turbine blade and the second wind turbine blade.

According to the second aspect, the invention also provides a transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, wherein the transportation and storage system includes a packaging system that comprises:
  a first root end frame for attachment to the root end of the first wind turbine blade, a first tip end frame for supporting a tip end portion of the first wind turbine blade,
  a second root end frame for attachment to the root end of the second wind turbine blade, and
  a second tip end frame for supporting a tip end portion of the second wind turbine blade, wherein the packaging system further comprises an intermediate protection means arranged between the first wind turbine blade and the second wind turbine blade.

According to a third aspect, the invention provides a method for transporting or storing at least two wind turbine blades and comprising a first wind turbine blade and a second wind turbine blade, the wind turbine blades each having a root end and a tip end, wherein the method comprises the steps of:
a) placing the root end of the first wind turbine blade in a first root end frame,
b) placing a tip end section of the first wind turbine blade in a first tip end frame,
c) placing the root end of the second wind turbine blade in a second root end frame,
d) placing a tip end section of the second wind turbine blade in a second tip end frame, wherein
  the first root end frame and the second tip end frame as well as the first tip end frame and the second root end frame are connected as L-shaped or T-shaped frame assemblies so that bases of the frame assemblies are attached to the root ends of the first and the second wind turbine blade, and extremities of the frame assemblies support a longitudinal section of the tip ends of the first and the second wind turbine blades.

According to the third aspect, the invention also provides a transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, wherein the transportation and storage system includes a packaging system that comprises:
  a first root end frame for attachment to the root end of the first wind turbine blade,
  a first tip end frame for supporting a tip end portion of the first wind turbine blade,
  a second root end frame for attachment to the root end of the second wind turbine blade, and
  a second tip end frame for supporting a tip end portion of the second wind turbine blade, wherein
  the first root end frame and the second tip end frame as well as the first tip end frame and the second root end frame are connected as L-shaped or T-shaped frame assemblies so that bases of the frame assemblies are attached to the root ends of the first and the second wind turbine blades, and extremities of the frame assemblies support a longitudinal section of the tip ends of the first and the second wind turbine blades.

Further, according to the third aspect, the invention provides a frame assembly for use in transport and storing of wind turbine blades, wherein the frame assembly comprises a root end frame part for attachment to a root end of a first wind turbine blade and a tip end frame part for supporting a tip end section of a second blade, wherein the root end frame part and the tip end frame part are attached in an L-shaped or T-shaped configuration.

According to a fourth aspect, the invention provides a transportation and storage system for at least two wind turbine blades and comprising a first wind turbine blade and a second wind turbine blade, the wind turbine blades each having a root end and a tip end as well as a shoulder defining a maximum chord of the blade, wherein the method comprises the steps of:

a) placing the root end of the first wind turbine blade in a first root end frame,
b) placing a tip end section of the first wind turbine blade in a first tip end frame,
c) placing the root end of the second wind turbine blade in a second root end frame,
d) placing the tip end section of the second wind turbine blade in a second tip end frame,
e) arranging the first and the second blade parallel to each other so that the first root end frame is placed adjacent the second root end frame, and the first tip end frame is arranged adjacent the second tip end frame, wherein the first wind turbine blade and the second wind turbine blade are arranged so that the maximum chord of the blades form angles of between 15 and 35 degrees to a horizontal plane, advantageously between 20 and 30 degrees, more advantageously around 25 degrees.

The advantages of the method and system according to the second, third and fourth aspects have previously been explained. It is clear that all the embodiments described with respect to the first aspect of the invention also apply to the second, third, and fourth aspect of the invention.

DETAILED DESCRIPTION OF THE INVENTION

Figure 2:
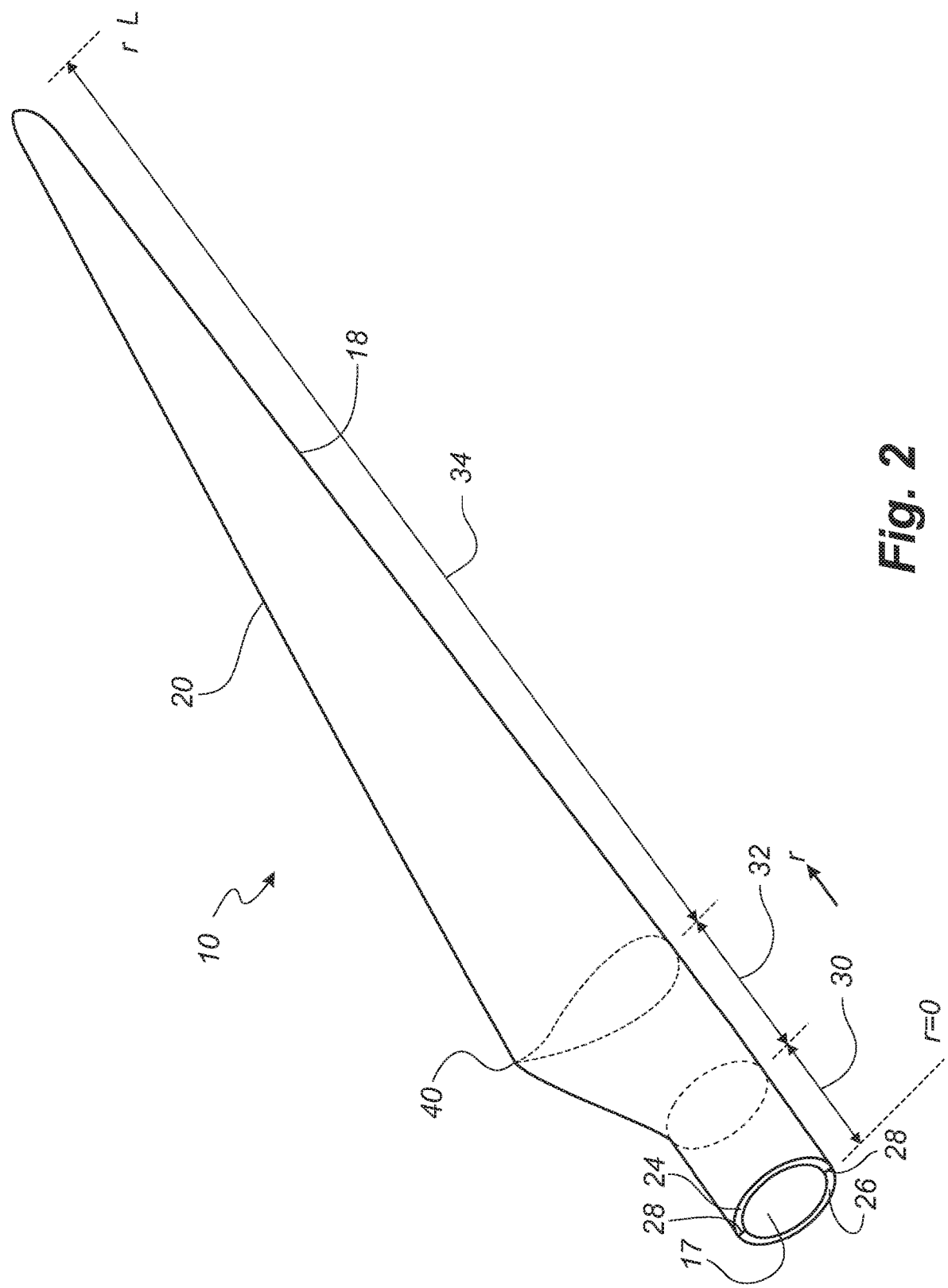
Figure 3:
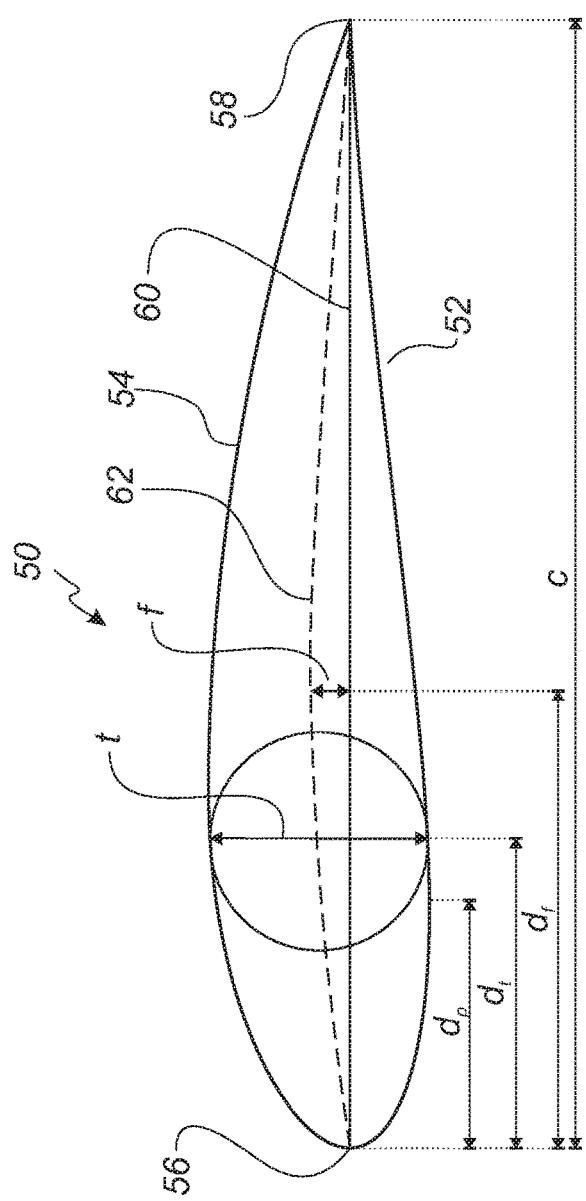
Figure 4:
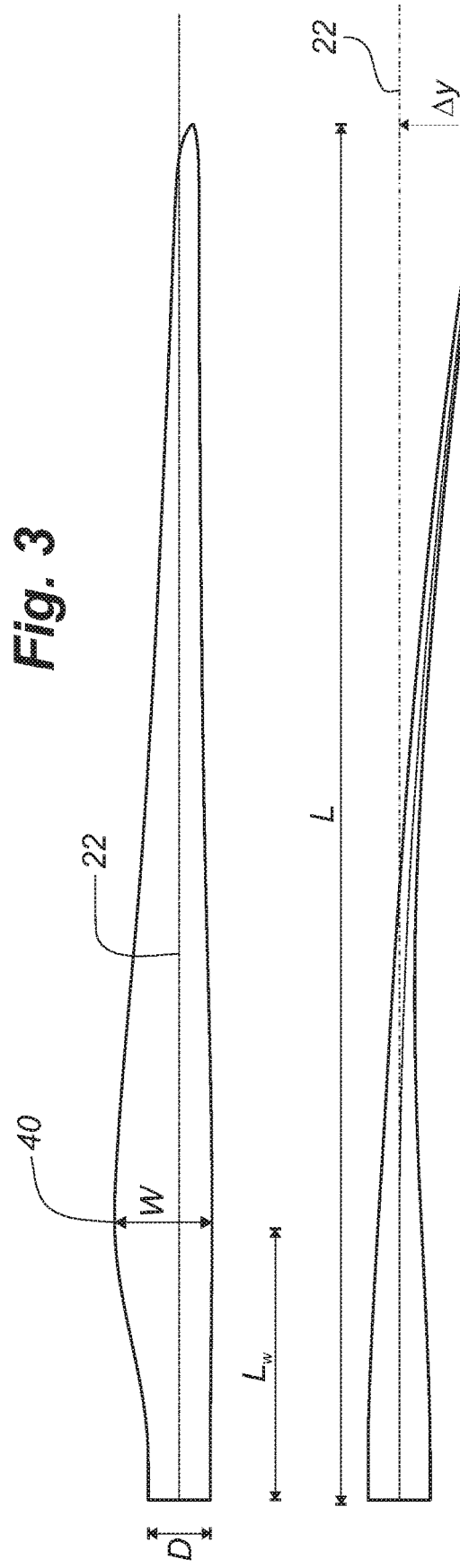
Figure 5:
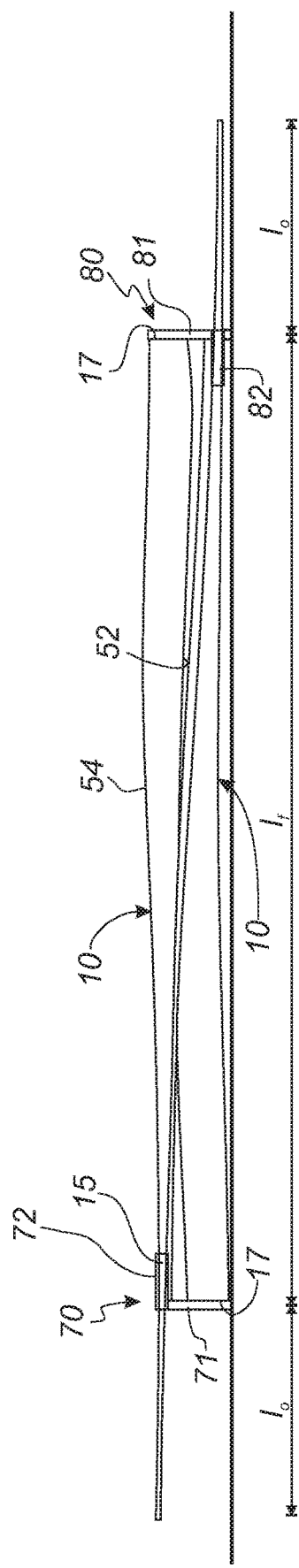
Figure 6:
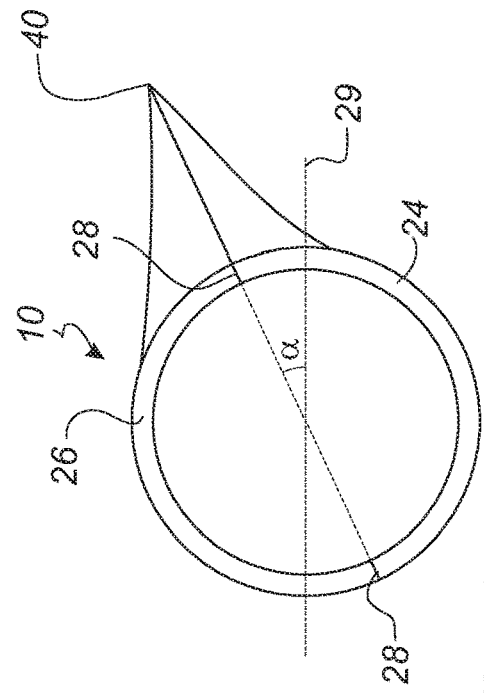
Figure 7:
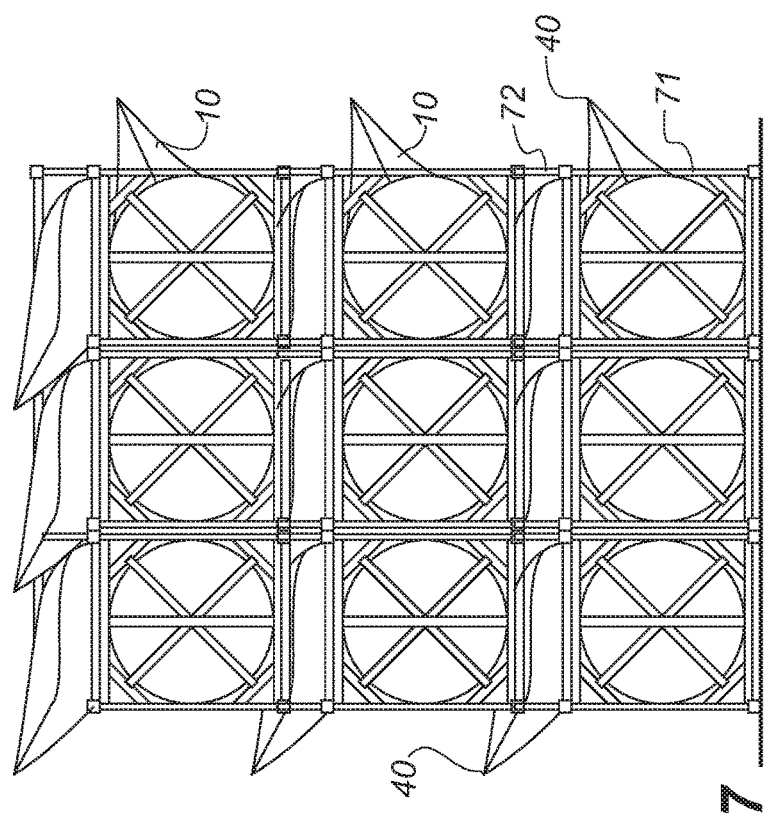
Figure 8:
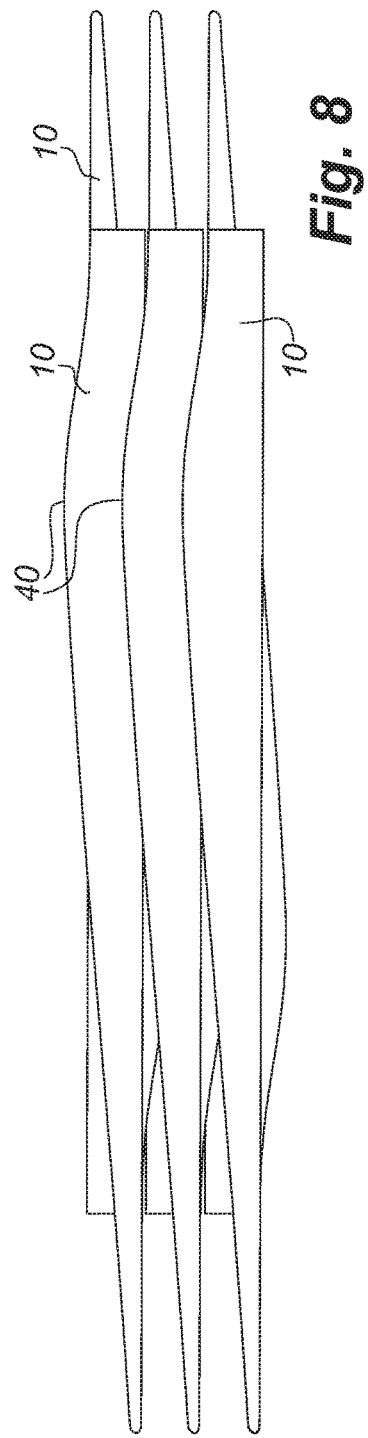
Figure 9:
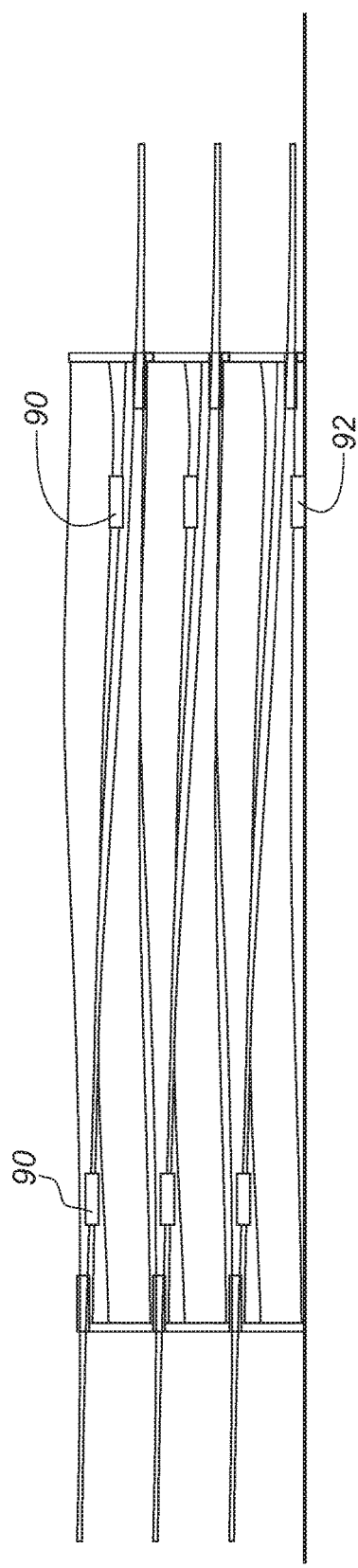
Figure 10:
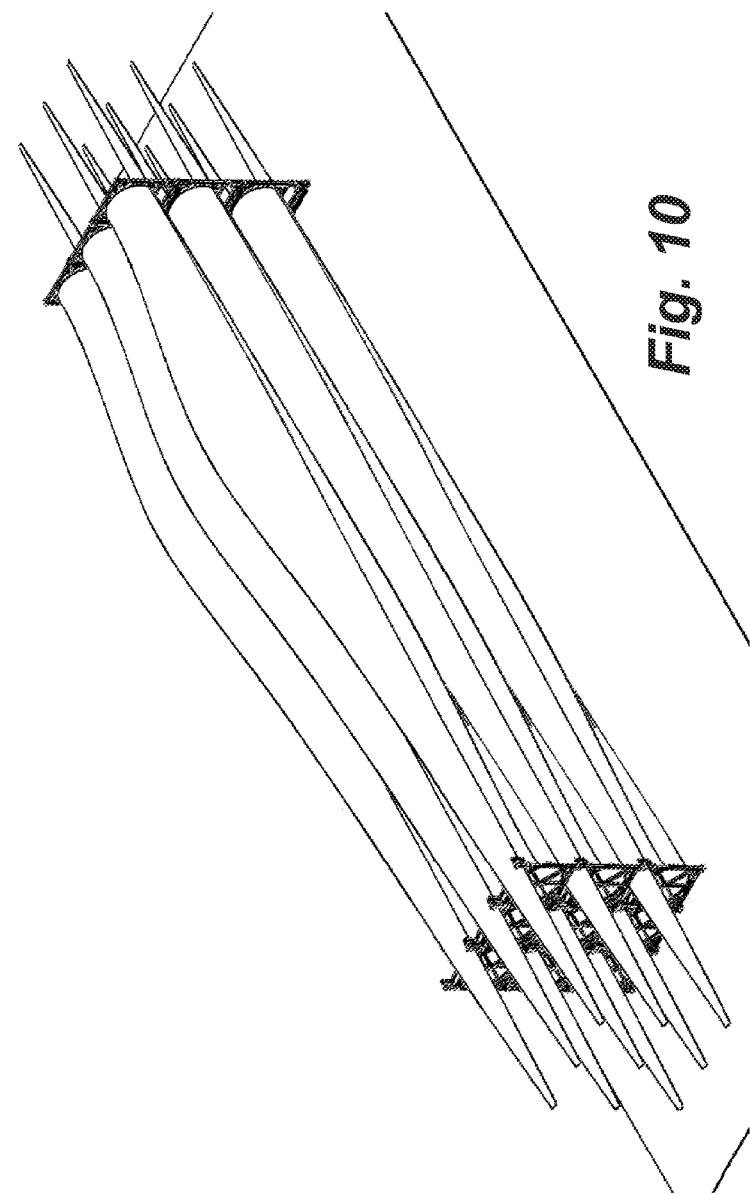

The invention is explained in detail below with reference to an embodiment shown in the drawings, in which FIG. 1 shows a wind turbine,
FIG. 2 shows a schematic view of a wind turbine blade according to the invention,
FIG. 3 shows a schematic view of an airfoil profile,
FIG. 4 shows a schematic view of the wind turbine blade according to the invention, seen from above and from the side,
FIG. 5 shows a schematic side view of a first wind turbine blade and a second wind turbine blade stored in a packaging system according to the invention,
FIG. 6 illustrates how the blades are oriented in the packaging system according to the invention,
FIG. 7 shows a schematic end view of blades stored in a stacked array of packaging systems according to the invention,
FIG. 8 shows a top view of the mutual arrangement of blades when stacked in an array,
FIG. 9 shows a schematic side view of a number of first wind turbine blades and second wind turbine blades stored in a packaging system according to the invention with intermediate protection means arranged between the blades, and
FIG. 10 shows a perspective view of blades stored in a stacked array of packaging systems in an alternative embodiment of the invention.

The present invention relates to transport and storage of wind turbine blades for horizontal axis wind turbines (HAWTs).

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell made of fibre-reinforced polymer and is typically made as a pressure side or upwind shell part 24 and a suction side or downwind shell part 26 that are glued together along bond lines 28 extending along the trailing edge 20 and the leading edge 18 of the blade 10.

FIGS. 3 and 4 depict parameters, which are used to explain the geometry of the wind turbine blades to be stored and transported according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 2, the root end is located at position r=0, and the tip end located at r=L. The shoulder 40 of the blade is located at a position r=Lw, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

Blades have over the time become longer and longer and may now exceed a length of 70 metres. The length of the blades as well as the shape of the blades with respect to shoulder, twist and prebending makes it increasingly difficult to transport the blades, in particular if a plurality of blades is to be transported and stored together. The shape and size of the blades also puts limitations on how closely the blades can be stored in a stacked array.

FIG. 5 shows a schematic view of first embodiment of a transportation and storage system according to the invention for transporting and storing a first wind turbine blade and a second wind turbine blade 10. The transportation and storage system includes a packaging system that comprises a first frame assembly 70. The first frame assembly 70 is composed of a root end frame 71 in form of a root end bracket for attachment to a root end face 17 of the first wind turbine blade, and a tip end frame 72 for supporting a tip end section 15 of the second wind turbine blade. The first frame assembly has an L-shaped configuration, where the root end bracket 71 forms the base of the L-shaped assembly, and the tip end frame 72 forms a transversely extending frame part (or extremity) that extends from the top of root end bracket 71. The second frame assembly 80 is also composed of a root end frame 81 in form of a root end bracket for attachment to a root end face 17 of the second wind turbine blade, and a tip end frame 82 for supporting a tip end section 15 of the first wind turbine blade. The first frame assembly has an L-shaped configuration, where the root end bracket 81 forms the base of the L-shaped assembly, and the tip end frame 82 forms a transversely extending frame part (or extremity) that extends from the bottom of root end bracket 81.

In terms of the following claims, it is clear that the first frame assembly comprises the first root end frame and the second tip end frame, whereas the second frame assembly comprises the second root end frame and the first tip end frame.

Some local regulations have limitations on the maximum distance $l_f$ between supports for transporting items, for instance a maximum of 42 metres. The packaging system accommodates for such regulations by being designed so that the tip ends of the first wind turbine blade and the second wind turbine blade extend beyond the root end frames 70, 80 so that a longitudinal extent $l_o$ or overhang of the tip ends extends beyond the root end frames 70, 80, thereby being able to transport blades of lengths exceeding the maximum distance $l_f$ between supports. Further, this novel setup has the advantage that the tip end sections are supported at a distance from the respective tip ends, where the blades are mechanically stronger than right at the tip. Thus, the probability of the frames damaging the blades is lowered significantly. Further, the L-shaped configuration of the frame assemblies 70, 80 is adapted to support the tip ends over a longitudinal extent of e.g. at least 1 metre, thereby ensuring an even better support for the blades.

The tip end frames 72, 82 may advantageously comprise one or more receptacles having an upwardly facing support face for supporting a part of the upwind side of the blade. Further, the tip end frames 72, 82 may advantageously be detachably coupled to the root end frames 71, 81.

In the shown setup, the blades are arranged with the pressure side (or upwind side) facing substantially downwards. Thereby, the blades are also arranged so that the middle part of the blade is spaced further from the support surface or ground due to the prebending of the blades. However, the blades are as shown in FIG. 6 turned so that the bond lines 28 as well as the chord of the shoulder 40 forms an angle α of approximately 25 degrees to a horizontal line 29. This has a further advantage, when blades are stacked in arrays comprising first and second frame assemblies 70, 80 and accordingly comprising an array of stored first and second wind turbine blades, since the blades may be stacked more compactly than conventional systems for transporting and storing such blades. This is better illustrated in FIGS. 7 and 8 that show blades stacked in an array, where FIG. 7 shows an end view of the transportation and storage system with the blades stored in the system, and FIG. 8 shows a top view of the blades in the array with the storage system removed from the figure in order to better illustrate the mutual arrangement of the blades.

From the end view shown in FIG. 7, it is seen that the first blades that have their root end faces attached to the root end brackets 71 are arranged so that the shoulders of the blades 40 point slightly upwards and to the right, whereas the second blades that have their tip end sections supported in the tip end frames 72 are arranged so that the shoulders 40 point upwards and towards the left side of the figure. Thereby, the blades can be stacked side by side in frames that are only slightly wider than the root diameter D of the blades.

In the top view shown in FIG. 8, it is seen that the blades are arranged so that they slightly overlap with the shoulder 40 of one blade extending partly over an adjacent blade, so that the upwind side of one blade near the shoulder faces down towards the downwind side near the leading edge of an adjacent blade.

In some situations it may be advantageous to provide additional support members for taking up loads from the blades, for instance by providing intermediate support members 90 between the first and the second wind turbine blades as shown in FIG. 9.

The intermediate support members 90 may advantageously be arranged near the tip end of the upper blade so that loads may be transferred from a tip section of the upper blade to a root section of a lower blade. An additional protection member 92 may be arranged between the lowermost blade in an array and the support platform or ground. The protection members 90, 92 may for instance be made of a foamed polymer.

The invention has been described with reference to a preferred embodiment. However, the scope of the invention is not limited to the illustrated embodiment, and alterations and modifications can be carried out without deviating from the scope of the invention that is defined by the following claims. The packaging system has for instance been described in relation to an L-shaped frame assembly. However, in another advantageous embodiment, the frame assembly may be T-shaped so that the root end bracket is attached to the tip end frame at an intermediate part thereof. Also, the blades may be stacked in a packaging system, where the root end frames and tip end frames are arranged in the same plane as shown in FIG. 10. The transportation and storage system has also been described in a configuration, where the second wind turbine blade is arranged above the first wind turbine blade. However, it is clear that the system could also be arranged in a configuration, where the first and the second wind turbine blades are arranged side-by-side. In such a configuration, the blades would instead be arranged so that the bond lines and chord of the shoulder form an angle of approximately 25 degrees compared to vertical. Further, the receptacles of the tip end frames could instead be adapted to support the leading edge of a tip end section instead.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side shell part/upwind shell part
26 suction side shell part/downwind shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
70 first frame assembly
71 root end frame/root end bracket (of first frame assembly)
72 tip end frame/transversely extending frame part (of first frame assembly)
80 first frame assembly
81 root end frame/root end bracket (of first frame assembly)
82 tip end frame/transversely extending frame part (of first frame assembly)
90 intermediate protection member
92 additional protection member
c chord length
$d_t$ position of maximum thickness
$d_f$ position of maximum camber
$d_p$ position of maximum pressure side camber
f camber
$l_r$ longitudinal distance between root end frames
$l_o$ longitudinal extent of blade tip overhang
L blade length
r local radius, radial distance from blade root
t thickness
Δy prebend

The invention claimed is:

1. A transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, and wherein the packing system comprises:

a first root end frame in form of a first root end bracket for attachment to a root end face of the first wind turbine blade;

a first tip end frame for supporting a tip end portion of the first wind turbine blade;

a second root end frame in form of a second root end bracket for attachment to a root end face of the second wind turbine blade; and a second tip end frame for supporting a tip end portion of the second wind turbine blade, wherein the second tip end frame is vertically stacked on the first root end frame, and the second root end frame is vertically stacked on the first tip end frame so that the tip end of the second wind turbine blade extends beyond the root end of the first wind turbine blade, and the tip end of the first wind turbine blade extends beyond the root end of the second wind turbine blade, when the first and the second wind turbine blades are arranged in the packaging system, wherein the transportation and storage system is adapted to stack the first and the second wind turbine blades on top of each other, and wherein at least a first intermediate protective member is arranged between the first wind turbine blade and the second wind turbine blade.

2. The transportation and storage system according to claim 1, wherein the tip end of the first wind turbine blade, when arranged in the first tip end frame, extends a first longitudinal length beyond the first tip end frame, and the tip end of the second wind turbine blade, when arranged in the second tip end frame, extends a second longitudinal length beyond the first tip end frame.

3. The transportation and storage system according to claim 2, wherein the first longitudinal extent and the second longitudinal extent are at least 2 metres.

4. The transportation and storage system according to claim 1, wherein the second tip end frame is vertically stacked on a top of the first root end frame, and a bottom of the second root end frame is vertically stacked on a top of the first tip end frame.

5. The transportation and storage system according to claim 1, wherein the first intermediate protective member is arranged adjacent to the tip end of an upper arranged blade of the first wind turbine blade and the second wind turbine blade.

6. The transportation and storage system according to claim 1, wherein the intermediate protective member is made of a foamed polymer.

7. The transportation and storage system according to claim 1, wherein the first tip end frame comprises a first upwardly facing receptacle for supporting a part of the first wind turbine blade, and the second tip end frame comprises a second upwardly facing receptacle for supporting a part of the second wind turbine blade.

8. The transportation and storage system according to claim 3, wherein the first longitudinal extent and the second longitudinal extent are at least 3.5 metres.

9. The transportation and storage system according to claim 8, wherein the first longitudinal extent and the second longitudinal extent are at least 5 metres.

10. A transportation and storage system for at least two wind turbine blades and comprising a first wind turbine blade and a second wind turbine blade, the wind turbine blades each having a root end and a tip end, said system comprising a packaging system that is adapted to placing the first wind turbine blade so that the tip end of the first wind turbine blade points in a first direction, and placing the second wind turbine blade so that the tip end of the second wind turbine blade points in a second direction, which is substantially opposite to the first direction, and wherein the packing system comprises:
 a first root end frame in form of a first root end bracket for attachment to a root end face of the first wind turbine blade;
 a first tip end frame for supporting a tip end portion of the first wind turbine blade, the first root end frame and the first tip end frame defining a first frame assembly having a shape selected from the group consisting of L-shaped and T-shaped;
 a second root end frame in form of a second root end bracket for attachment to a root end face of the second wind turbine blade; and
 a second tip end frame for supporting a tip end portion of the second wind turbine blade, the second root end frame and the second tip end frame defining a second frame assembly having a shape selected from the group consisting of L-shaped and T-shaped,
 wherein the second tip end frame is vertically stacked on the first root end frame, and the second root end frame is vertically stacked on the first tip end frame so that the tip end of the second wind turbine blade extends beyond the root end of the first wind turbine blade, and the tip end of the first wind turbine blade extends beyond the root end of the second wind turbine blade, when the first and the second wind turbine blades are arranged in the packaging system.

\* \* \* \* \*

UNITED STATES PATENT AND TRADEMARK OFFICE
CERTIFICATE OF CORRECTION

PATENT NO. : 10,589,941 B2
APPLICATION NO. : 15/625319
DATED : March 17, 2020
INVENTOR(S) : Jacobus Van Der Zee Page 1 of 1

It is certified that error appears in the above-identified patent and that said Letters Patent is hereby corrected as shown below:

On the Title Page

Item (73) please remove the Assignee:
"LM WP PATENT HOLDINGS A/S"
And replace with:
"LM WP PATENT HOLDING A/S"

Signed and Sealed this
Twelfth Day of May, 2020

Andrei Iancu
*Director of the United States Patent and Trademark Office*